(12) United States Patent
Arnold et al.

(10) Patent No.: US 7,426,450 B2
(45) Date of Patent: Sep. 16, 2008

(54) SYSTEMS AND METHODS FOR MONITORING SPEED

(75) Inventors: David V. Arnold, Provo, UT (US); John B. Dougall, Jr., Highland, UT (US); Bradley Curtis Giles, American Fork, UT (US); Bryan Robert Jarrett, Orem, UT (US); Thomas William Karlinsey, Orem, UT (US); Jonathan L. Waite, Orem, UT (US)

(73) Assignee: Wavetronix, LLC, Provo, UT (US)

( * ) Notice: Subject to any disclaimer, the term of this patent is extended or adjusted under 35 U.S.C. 154(b) by 0 days.

(21) Appl. No.: 10/754,217

(22) Filed: Jan. 9, 2004

(65) Prior Publication Data

US 2004/0174294 A1 Sep. 9, 2004

Related U.S. Application Data

(60) Provisional application No. 60/439,109, filed on Jan. 10, 2003.

(51) Int. Cl.
G01P 5/00 (2006.01)
G01P 11/00 (2006.01)

(52) U.S. Cl. ..................................... 702/142
(58) Field of Classification Search .................. 702/96, 702/142, 143, 149; 340/917, 918, 933, 936
See application file for complete search history.

(56) References Cited

U.S. PATENT DOCUMENTS

| 3,819,919 | A | * | 6/1974 | McGunigle | 702/45 |
| 4,244,026 | A | * | 1/1981 | Dickey, Jr. | 702/143 |
| 4,258,351 | A | | 3/1981 | Shigeta et al. | |
| 4,317,117 | A | | 2/1982 | Chasek | 343/6 ND |
| 4,430,636 | A | | 2/1984 | Bruce | |
| 4,659,982 | A | | 4/1987 | Van de Velde et al. | |
| 4,700,191 | A | | 10/1987 | Manor | |
| 4,866,438 | A | | 9/1989 | Knisch | |
| 4,908,615 | A | | 3/1990 | Bayraktaroglu | |
| 5,066,950 | A | | 11/1991 | Schweitzer et al. | |
| 5,122,961 | A | * | 6/1992 | Toyama et al. | 701/208 |
| 5,161,107 | A | | 11/1992 | Mayeaux et al. | |
| 5,204,682 | A | * | 4/1993 | Beasley | 342/117 |

(Continued)

FOREIGN PATENT DOCUMENTS

DE 4223119 6/1993

(Continued)

OTHER PUBLICATIONS

RTMS User Manual, EIS Electronic Integrated Systems, Inc., Issue 3, Sep. 2000.

(Continued)

*Primary Examiner*—Michael P Nghiem
(74) *Attorney, Agent, or Firm*—Workman Nydegger

(57) ABSTRACT

Systems and methods for measuring the speed and/or direction of a target such as a vehicle in a field of view. The speed of a vehicle is measured using distance measurements, phase measurements, or Doppler shift measurements using a single transducer side fire configured sensor. The speed of a vehicle can be measured using laterally spaced transducers in a side fire or off angle configuration and using a single transducer sensor in a forward fire configuration.

28 Claims, 7 Drawing Sheets

U.S. PATENT DOCUMENTS

| | | | |
|---|---|---|---|
| 5,339,081 A | 8/1994 | Jefferis et al. | |
| 5,402,346 A | 3/1995 | Lion et al. | 364/436 |
| 5,448,484 A | 9/1995 | Bullock et al. | |
| 5,504,490 A | 4/1996 | Brendle et al. | |
| 5,510,990 A | 4/1996 | Hibino et al. | |
| 5,555,036 A * | 9/1996 | Harnett et al. | 340/933 |
| 5,572,450 A | 11/1996 | Worthy | 364/571.02 |
| 5,581,249 A | 12/1996 | Yoshida | |
| 5,621,645 A | 4/1997 | Brady | |
| 5,663,720 A | 9/1997 | Weissman | |
| 5,694,134 A | 12/1997 | Barnes | |
| 5,710,565 A | 1/1998 | Shirai et al. | |
| 5,714,965 A | 2/1998 | Taguchi | |
| 5,748,153 A | 5/1998 | McKinzie, III et al. | |
| 5,757,307 A | 5/1998 | Nakatani et al. | |
| 5,790,403 A | 8/1998 | Nakayama | |
| 5,793,491 A | 8/1998 | Wangler et al. | |
| 5,798,983 A | 8/1998 | Kuhn et al. | |
| 5,821,879 A | 10/1998 | Liepmann | 340/942 |
| 5,878,367 A | 3/1999 | Lee et al. | |
| 5,884,212 A | 3/1999 | Lion | |
| 5,920,280 A | 7/1999 | Okada et al. | |
| 5,949,383 A | 9/1999 | Hayes et al. | |
| 5,995,900 A | 11/1999 | Hsiao et al. | |
| 6,011,515 A | 1/2000 | Radcliffe et al. | |
| 6,081,226 A | 6/2000 | Caldwell et al. | |
| 6,114,973 A | 9/2000 | Winner et al. | |
| 6,124,807 A | 9/2000 | Heckeroth et al. | |
| 6,160,494 A | 12/2000 | Sodi et al. | 340/936 |
| 6,177,885 B1 | 1/2001 | Weil et al. | |
| 6,195,019 B1 | 2/2001 | Nagura | |
| 6,198,437 B1 | 3/2001 | Watson et al. | |
| 6,204,778 B1 | 3/2001 | Bergan | |
| 6,253,162 B1 | 6/2001 | Jarman et al. | |
| 6,266,627 B1 | 7/2001 | Gatsonides | 702/143 |
| 6,272,443 B1 * | 8/2001 | Motzko | 702/143 |
| 6,366,870 B2 | 4/2002 | Jarman et al. | |
| 6,373,427 B1 | 4/2002 | Hohne | |
| 6,377,191 B1 * | 4/2002 | Takubo | 340/937 |
| 6,396,435 B1 | 5/2002 | Fleischhauer et al. | |
| 6,396,437 B1 | 5/2002 | Marino et al. | |
| 6,470,262 B2 | 10/2002 | Kerner et al. | |
| 6,556,916 B2 | 4/2003 | Waite et al. | |
| 6,577,269 B2 | 6/2003 | Woodington et al. | |
| 6,614,536 B1 | 9/2003 | Doemens et al. | |
| 6,683,557 B2 | 1/2004 | Pleva et al. | |
| 6,693,557 B2 | 2/2004 | Arnold et al. | |
| 6,707,419 B2 | 3/2004 | Woodington et al. | |
| 6,750,787 B2 | 6/2004 | Hutchinson | 340/942 |
| 6,781,523 B2 | 8/2004 | Matsui et al. | |
| 6,816,107 B2 | 11/2004 | Pleva et al. | |
| 6,876,949 B2 * | 4/2005 | Hilliard et al. | 702/182 |
| 6,888,474 B2 | 5/2005 | Sharp et al. | |
| 6,959,259 B2 * | 10/2005 | Vock et al. | 702/142 |
| 2001/0045042 A1 | 11/2001 | Theile et al. | |
| 2005/0231384 A1 | 10/2005 | Shimotani | |
| 2005/0242306 A1 | 11/2005 | Sirota, et al. | |

FOREIGN PATENT DOCUMENTS

| | | | |
|---|---|---|---|
| EP | 0716949 | | 6/1996 |
| EP | 1180758 | | 2/2002 |
| FR | 2 812 402 | * | 2/2002 |
| GB | 1443701 | | 7/1976 |
| JP | 4084300 | | 3/1992 |
| JP | 6162387 | | 6/1994 |
| WO | WO 99/08128 | | 2/1999 |
| WO | WO 00/45462 | | 8/2000 |

OTHER PUBLICATIONS

Stalker Lidar Operator Manual, Applied Concepts, Inc., copyright 2000.

Sensys RS240 Radar Sensor, circa Oct. 2002.

Document Title: Adaptive Lane Finding in Road Traffic Image Analysis Author: Stewart, B.D., Reading, I., Thomson, M.S., Binnie, T.D.; Dickinson, K.W.; Wan, C.L. Publication Name: Road Traffic Monitoring and Control, 1994., Seventh International Convference on Page Nos.: 133-136 Publication date: Apr. 26-28, 1994.

Palen J (2001) A Watching Brief. Traffic Technol Int Oct./Nov. 43-46.

U.S. Appl. No. 10/603,608, filed Jun. 26, 2003, Huntingdon et al.

Sakai et al., Optical Spatial Filter Sensor for Ground Speed, Presented at the International Commission of Optics Topical Meeting, Kyoto, 1994, Optical Review, vol. 2, No. 1 (1995), 3 pages.

SpeedInfo, DVSS-1000 Installation Manual and Users Guide, Rev. 2.0, Feb. 18, 2004, 10 pages.

U.S. Department of Transporation Federal Highway Administration, Field Test of Monitoring of Urban Vehicle Operations Using Non-Intrusive Technologies, Final Report, May 1997, 126 pages.

Detection Technology: For IVHS - vol. 1: Final Report Addendum, Publication No. FHWA-RD-96-100, Jul. 1995, 8 pages.

Texas Transporation Institute, Initial Evaluation of Selected Detectors to Replace Inductive Loops on Freeways, Report No. FHWA/TX-00/1439-7, Apr. 2000, 89 pages.

Yellin et al., An Algorithm for Dual-Chanel Noiseless Signal Reconstruction and its Performance Analysis, IEEE Transactions on Signal Processing, vol. 47, No. 6, Jun. 1999, 17 pages.

Canadian Driver, Automatic Collision Avoidance System Unveiled, Jun. 12, 2002, http://www.canadiandriver.com/news/020612.htm, 3 pages.

Rivenq-Menhaj et al., IOP Electronic Journals, Measurement Science and Technology, Combining Two Radar Techniques to Implement a Collision Avoidance System, www.iop.org/EJ/abstract/0957-0233/9/8/030, from Meas. Sci. Technol. 9 1343-1346, Aug. 1998, 2 pages.

Jansson et al., Decision Making for Collision Avoidance Systems, Copyright 2002, Society of Automotive Engineers Publication No. 2002-01-0403, 8 pages.

Gille, Velocity Probability Density Functions for Altimetry, Journal of Physical Oceanography, vol. 30, Jan. 2000, 12 pages.

Nuñez-Garcia et al., Random Sets and Histograms, Control Systems Center, UMIST, Fuzz-IEEE 2001:1183-1186, http://www.umist.ac.uk/csc,2001, 6 pages Waner et al., Calculus Applied to Probability and Statistics, Calculus and Probability, Sep. 2, 1996, http://people/hofstra.edu/faculty/Stefan_Waner/cprob/cprob2.html, 13 pages.

Berka et al., New Perspectives for ATMS: Advanced Technologies in Traffic Detection, Journal of Transportation Engineering, Jan./Feb. 1998, 7 pages.

Kim, et al., Two Novel Vehicle Detectors for the Replacement of a Conventional Detector, Microwave Journal (International ed.). Dedham: Jul. 2001. vol. 44, Iss. 7; http://proquest.umi.com/proxygw.wrlc.org/pqdlink?Ver. . ., 7 pages.

Krämer, Envisioning a Radar-Based Automatic Road Transportaion System, Intelligent Transportation Systems, May/Jun. 2001, 3 pages.

News Around the Industry, Spruce Meadows Partners, IMSA Journal, Nov./Dec. 2004, 4 pages.

Stellar Opportunities, How One Idaho Investment Firm Views the State's Business Future, Idaho Business IQ, Nov./Dec. 2003, 5 pages.

Howard, Venture Capitalists Break Cover, The Idaho Statesman, Stellar Tech Ends 4 Years of Keeping a Low Porfile, Sep. 9, 2003; http://www.idahostatesman.com/Business/story.asp?ID=48714, 2 pages.

Reijmers et al., The Influence of Vehicle Distribution Models on Packet Success Probability on a Three Lane Motorway, IEEE Publication No. 0-7803-4320-4/98, Copyright 1998 IEEE, 5 pages.

Gern et al., Advanced Lane Recognition - Fusing Vision and Radar, Proceedigs of the IEEE Intelligent Vehicles Symposium 2000, Dearborn (MI) USA, Oct. 3-5 2000, 7 pages.

González, Lane Detection Using Histogram-Based Segmentatio and Decision Trees, 2000 IEEE Intelligent Transportation Systems Conference Proceedings, Dearborn (MI ) USA, Oct. 103, 2000, 6 pages.

Reijmers et al., Performance Analysis of Slotted Aloha on a Three Lane Motorway Using Measured Vehicle Positions, IEEE Publication No. 0-7803-3659-3/97, Copyright 1997 IEEE, 5 pages.

Ma et al., Road and Lane Edge Detection with Multisensor Fusion Methods, IEEE Publication No. 0-7803-5467-2/99.

Pilutti, et al., Identification of Driver State for Lane-Keeping Tasks, IEEE Transactions on Systems, Man, and Cybernetics - Part A: Systems and Humans, vol. 29, No. 5, Sep. 1999, 17 pages.

Wilson et al., The Potential of Precision Maps in Intelligent Vehicles, Proceedings of IEEE Intern. Conf. on Intelligent Vehicles, IEEE Oct. 1998, 4 pages.

Able, A Radar Study of the Altitude of Nocturnal Passerine Migration, Bird-Banding, vol. 41, No. 4, Oct. 1970, 9 pages.

Manor, SPIDER: A Wireless Solution for Mid-block Detection, IMSA Journal, Mar./Apr. 2003, 6 pages.

Gresham, et al., Ultra Wide Band 24 GHz Automotive Radar Front-end, 2003 IEEE MTT-S Digest, 4 pages.

FCC Federal Communications Commission, Consumer & Government Affairs Bureau, Digital Radio - The Sound of the Future, http://www.fcc.gov/cgb/consumerfacts/digitalradio.html,Reviewed/Updated on Sep. 24, 2003, 3 pages.

Klein, Sensor Technologies and Data Requirements for ITS, Artech House, Norwood, MA, Jun. 2001, 739 pages.

Federal Register, Jun. 1, 2001, vol. 66, No. 106, Participation in the Intelligent Transportation Infrastructure Program, 2 pages.

Mobility Technologies, Mobility Technologies Offers Exclusive Data and Technology with New Traffic Pulse Partner Program, Press Release, May 31, 2001, 6 pages.

Yang, Bi-Mode Time-Space Multiplexing Antenna Array for Multi-Targets Detection in Automotive Application, IEEE Publication No. 0-7803-7070-8/01, Copyright 2001 IEEE, 4 pages.

Yung et al., Vehicle-Type Identification through Automated Virtual Loop Assignment and Block-Based Direction biased Motion Estimation, IEEE Publication No. 0-7893-4975-X/98, Copyright 1999 IEEE, 5 pages.

Schoepflin et al., Dynamic Camera Calibration of Roadside Traffic Management Cameras, The IEEE 5th International Conference on Intelligent Transportation Systems, Sep. 3-6 2002, Singapore, 6 pages.

Pumrin et al., Roadside Camera Motion Detection for Automated Speed Measurement, The IEEE 5th International Conference on Intelligent Transportation Systems, Sep. 306 2002, Singapore, 5 pages.

Swangnate et al., A Conductor-Backed Coplanar Waveguide Direction Coupler for Varactor-Tuned Phase Shifting, Journal of KMITNB, vol. 12, No. 2, Apr.-Jun 2002, 5 pages.

Forman et al., A K-Band Ground-Backed CPW Balanced Coupler and Integrated Antenna Feed, European Microwave Conference, Oct. 2000, 4 pages.

Giles, Benefits of Auto-Configuring Traffic Sensing Equipment, Aug. 2004, 17 pages.

Kotzenmacher et al., Evaluation of Non-Intrusive Traffic Detection System, 2004 North American Travel Monitoring Exhibition & Conference (NATMEC), Jun. 27, 2004, 14 pages.

Detector User Needs from the Traffic Signals Workshop Held in Seattle, WA during Jul. 2003, circa Jul. 2003, 41 pages.

Vehicle Detector Workshop, TexITE, Jun. 2000, pp. 5-39.

R.L. Smith et al. "Development of a Low Cost, FM/CW Transmitter for Remote Sensing," IGARSS 2000 (Hawaii).

J.C. Beard et al. "6GHz Range Finder Using Pulse Compression," IGARSS 2000 (Hawaii).

J.L. Waite et al. "Interferometric Radar Principles in Track Hazard Detection to Improve Safety," IGARSS 2000 (Hawaii).

D.A. Zaugg et al. "Ocean Surface and Landslide Probing with a Scanning Radar Altimeter," IGARSS 2000 (Hawaii).

B.T. Walkenhorst et al. "A Low cost, Radio Controlled Blimp as a Platform for Remote Sensing," IGARSS 2000 (Hawaii).

Liu et al. "Radiation of Printed Antennas with a Coplanar Waveguide Feed," IEEE Transactions on Antennas and Propagation, vol. 43, No. 10, Oct. 1995, pp. 1143-1148.

T. Metzler, "Microstrip Series Arrays," IEEE Transactions on Antennas and Propagation, vol. AP-29, No. 1, Jan. 1981, pp. 174-178.

A.G. Derneryd, "Linearly Polarized Microstrip Antennas," IEEE Transactions of Antennas and Propagation, Nov. 1976, pp. 846-851.

SmarTek Acoustic Sensor - Version 1 (SAS-1) Installation and Setup Guide; Apr. 3, 2003, 23 pages.

University Research in Support of the Department of Transportation Program on Remote Sensing Applications in Transportation (DTRS56-MM-BAA-0004) Nov. 1999, 25 pages.

Cambridge Consultants; Technology at the crossroads: new radar sensor allows pedestrians and traffic to coexist; Feb. 24, 2004, 2 pages.

Transportation Systems Railway Grade Crossing Sensor, Aug. 17, 2004, 1 pg.

Transportation Systems Millimeter Wave Radar Traffic Sensor, Auto Trak, Aug. 17, 2004, 2 pgs.

Image Sensor for Measuring Volumes by Direction, Atsushi Saito, International Sales & Marketing Department, Social Systems Solution & Service Business Company, OMRON Corporation, Tokyo Japan, ITS World Congress, Oct. 2004, 1 pg.

Computer Vision Algorithms for Intersection Monitoring; Harini Veeraraghavan, Osama Masoud, and Nikolas P. Papanikolopoulous, Senior Member, IEEE IEEE Transactions on Intelligent Transportation Systems, vol. 4, No. 2, Jun., 2003, 12 pages.

Vehicle Detector Workshop, TexITE, Jun. 2000, pp. 5-39.

Examination Report dated Mar. 29, 2007 from European Patent Application No. 04 701 207.5, 3 pages.

* cited by examiner

SYSTEMS AND METHODS FOR MONITORING SPEED

RELATED APPLICATIONS

This application claims the benefit of U.S. Provisional Application Ser. No. 60/439,109, filed, Jan. 10, 2003 and entitled SYSTEMS AND METHODS FOR DETERMINING THE VELOCITY OF A TARGET which is hereby incorporated by reference.

BACKGROUND OF THE INVENTION

1. The Field of the Invention

The present invention relates to systems and methods for monitoring traffic. More particularly, the present invention relates to systems and methods for measuring the speed of a vehicle and more specifically to systems and methods for measuring the speed of a vehicle using different sensor configurations.

2. Background and Relevant Art

As the number of vehicles on roadways increases and traffic becomes more congested, monitoring existing traffic and planning for future traffic become more important. Monitoring traffic in particular has received increasing attention from traffic planners. The information gathered from monitoring various aspects of traffic is useful for a variety of different purposes including law enforcement, traffic planning, safety, incident management, and traffic reporting.

The speed of vehicles, for example, traveling on a roadway is one of the activities that is often monitored. However, monitoring the speed of vehicles using people is difficult and expensive. As a result, traffic sensors that automatically monitor and measure the speed of vehicles are becoming increasingly common on roadways. Speed measurements are typically taken from two types of sensor configurations that are referred to as a side fire sensor configuration and a forward fire sensor configuration. As their names suggest, a side fire sensor configuration measures the speed of the vehicle as the vehicle passes by the measuring sensor. In a forward fire sensor configuration, the vehicle is either traveling towards or away from the measuring sensor. Current side fire systems and forward fire systems, however, have various disadvantages.

For example, one side fire method for measuring the speed of a vehicle is based on measuring a detection time that is related to a specific detection zone. As the speed of a vehicle increases, the detection time for the detection zone decreases. This method, however, assumes that every vehicle has an average length. As a result, the speed measurement for vehicles that do not have an average length is skewed. In addition, the sensor used in this side fire configuration must be calibrated to remove the length of the detection zone from the speed computation.

Another side fire method for measuring the speed of a vehicle is based on a small detection zone that is located within a larger detection zone. In this method, the elapsed time between an initial detection of the vehicle in the larger zone and an initial detection of the vehicle in the smaller zone is combined with the distance between the edges of the two zones to determine the speed of the vehicle. Because the zones are different, the signals used to detect the vehicles are dissimilar. The dissimilarities between the responses of the two signals in the two zones introduces variability into the speed measurement.

Another side fire method for measuring the speed of a vehicle uses two infrared beams that are separated by a lateral distance. The elapsed time between the interruption of each beam and the lateral distance between the two beams are used to calculate the speed of a vehicle. This method, however, requires two relatively narrow infrared beams for each lane of traffic that is being observed. The hardware required to implement this method can introduce significant cost.

One forward fire method for determining the speed of a vehicle is based on distance measurements using a laser. Several distance measurements are performed in a short period of time and the change in the target distance is calculated. This method can potentially result in erroneous results if the laser is swept along the side of the vehicle as the distance measurements are taken.

Another forward fire method is a continuous wave Doppler radar that determines the speed of a vehicle based on the Doppler shift. However, devices relying on the Doppler shift cannot distinguish between vehicles and cannot determine the range to a particular vehicle. Other forward fire methods define a pair of detection zones. The distance between the two zones and the elapsed time between detections in the two zones is used to compute the speed of a vehicle. These methods are often inaccurate as the signals returned by the respective zones are often dissimilar as previously mentioned.

The speed of a vehicle can also be measured by embedding inductive loops in a roadway. The signals generated by a pair of loops are processed to extract a time delay. The time delay and the distance between the two loops can be used to determine a vehicle's speed. The primary disadvantage of this method is that the inductive loops are difficult and expensive to install and maintain. In addition to being costly, installing and maintaining the inductive loops typically interferes with traffic.

BRIEF SUMMARY OF THE INVENTION

These and other limitations are overcome by the present invention which relates to systems and methods for measuring the speed of a vehicle. In some embodiments, the range to a vehicle and a direction of travel can also be determined. The speed of a vehicle is measured using either a side fire sensor configuration or a forward fire sensor configuration and in some alternative embodiments an off angle configuration In one embodiment of the present invention, a side fire sensor configuration uses either a single transducer sensor or a dual transducer sensor. In the case where dual transducers are used, the transducers can be mounted in a single sensor or in a pair of sensors. In a side fire single transducer configuration, the speed of a vehicle may be measured using distance measurements, signal phase measurements, and Doppler shift measurements. In another embodiment, multiple transducers may be used.

When distance measurements are used to measure the speed of a vehicle, the sensor makes periodic distance measurements to a vehicle as the vehicle passes through a field of view of the sensor. The resulting time series of distance measurements is parabolic in nature. The width of the near parabola is proportional to the speed of the vehicle and the distance to the path of the vehicle through the sensor's field of view. Phase measurements are also parabolic in nature and the same methods used to determine the speed and direction from distance measurements can be used with phase measurements, with the addition of phase unwrapping. The Doppler shift of a vehicle changes linearly and the slope of the linear change is proportional to the speed of the vehicle and the distance to the vehicle's path through the sensor's field of view. The direction of travel of the vehicle can be determined from asymmetries in the transducer's field of view that results in asymmetries in the Doppler shift, phase, and distance measurements.

Two laterally separated transducers can be used to measure the speed of a vehicle in a dual transducer sensor configuration. Dual transducer configurations are particularly suited for side fire configurations but can also be designed to perform well in off angle configurations. In this case, the speed of the vehicle is proportional to the delay between the signals received by the respective signals. The fields of view of the sensors typically overlap and the sensors generate similar signals. This avoids errors that would otherwise be introduced by dissimilar signals. Also, the direction of the vehicle can be determined from the sign of the time delay between the signals of the two sensors.

When the sensor is used in a forward fire configuration, the sensor determines the location of vehicles or targets in the field of view. Each vehicle is tracked using distance measurements. The rate of change of the distance measurements can be converted to a speed for each vehicle. The sign of the rate of change of the distance measurements indicates if the direction of travel is toward or away from the sensor, thus indicating direction. In this manner, more than one vehicle can be monitored simultaneously.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to systems and methods for measuring the speed of a target such as a vehicle on a roadway. As described in more detail below, the present invention measures the speed of a vehicle using a single transducer side fire sensor configuration, a dual transducer sensor configuration, or a forward fire sensor configuration. In some alternative embodiments, both the side fire sensor configuration, the dual transducer sensor configuration, and the forward fire sensor configuration can use multiple transducers. The speed is measured by using the sensor to receive a signal from the targets in the field of view of the sensor. The signal received by the sensor(s) could be a reflection of a signal transmitted by the sensor(s) towards the targets in a field of view or alternatively, the signal could be an emission from the target itself. The signal(s) generated and received by the sensor(s) are used to measure distance, phase change, Doppler shift, and the like. The signals used by the embodiments of the present invention may include, but are not limited to, radio frequency signals, electromagnetic signals, infrared signals, laser signals, acoustic signals, and the like or any combination thereof. These measurements are used to determine the speed of a target such as a vehicle. In some alternative embodiments, the direction of the target can also be determined.

Figure 1:
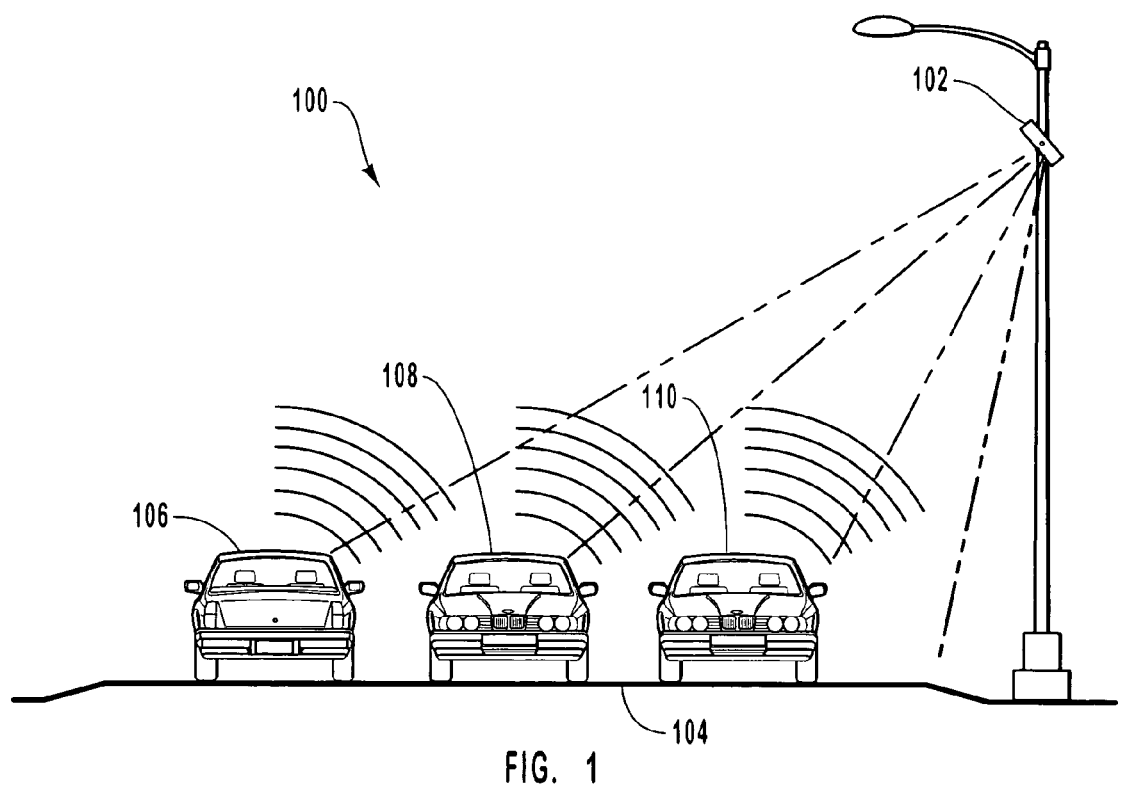
FIG. 1 illustrates one embodiment of a sensor arranged in a side fire sensor configuration.

FIG. 1 illustrates an example of a side fire configuration (100) for measuring the speed of at least one vehicle. In FIG. 1, the vehicles 106, 108, and 110 are traveling on a roadway 104. The roadway 104, in this example, provides three lanes of traffic, but is representative of all roadways or other locations where speed of a target may be measured. A sensor 102 is mounted on the side of the roadway 104 and is able to transmit a signal towards the vehicles 106, 108, and 110. Thus, vehicles traveling on a roadway 104 typically pass through a field of view of the sensor. The sensor 102 is also able to detect the signals that are reflected by the vehicles traveling through the sensor's field of view. If a side fire sensor is angled such that the field of view is no longer generally perpendicular to the roadway then the configuration could be considered an off angle configuration. One example of a suitable sensor is described in U.S. patent application Ser.

No. 09/964,668 filed Sep. 27, 2001 and entitled VEHICULAR TRAFFIC SENSOR which is hereby incorporated by reference.

Figure 2:
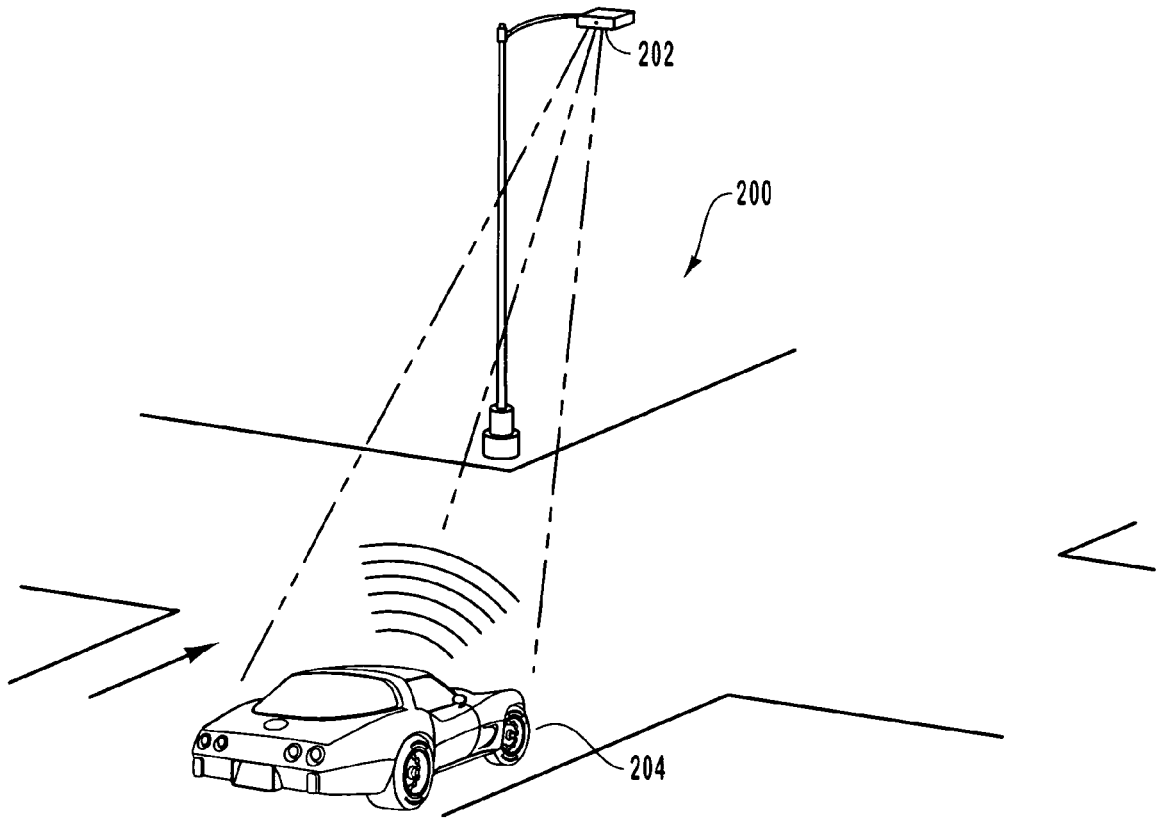
FIG. 2 illustrates one embodiment of a sensor arranged in a forward fire sensor configuration.

FIG. 2 illustrates an example of a forward fire configuration 200 for measuring the speed of a vehicle. FIG. 2 illustrates an intersection where a vehicle 204 is traveling on a roadway towards a sensor 202. In this example, the sensor 202 transmits signals that reflect off of the vehicle 204 and are received by the sensor 202. Thus, a forward fire configuration indicates that the vehicle is traveling toward the sensor although a forward fire configuration may also be utilized with a vehicle that is traveling away from the sensor 202. A sensor that has a field of view that points down or straight down may be considered as either a forward fire sensor or a side fire sensor.

Figure 3:
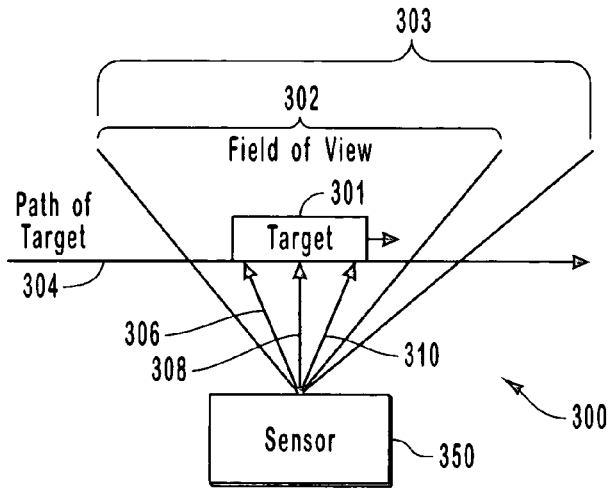
FIG. 3 illustrates the path of a target through an asymmetric field of view of a sensor in a side fire sensor configuration.

FIG. 3 illustrates one embodiment of the present invention for measuring or determining the speed of a target such as a vehicle in a single transducer side fire configuration. The field of view 302 of the sensor 350 defines an area where a target can be detected and where the speed of the target is determined. The target 301 passes through the field of view 302. More specifically, the target 301 passes through the field of view 302 such that the path 304 of the target is essentially perpendicular to the sensor 350 or to the field of view 302. The sensor 350 is typically mounted such that the target path is perpendicular to the field of view 302. Alternatively, the sensor 350 can be mounted such that it is not perpendicular to the field of view. This is illustrated, for example, by the field of view 303, which is asymmetrical and can be used, for example, in determining vehicle direction. In yet another embodiment, asymmetry can be introduced into the transducer pattern of the sensor 350. Field of view can thus refer to a symmetrical field of view and an asymmetrical field of view. In some embodiments, the field of view may include the fields of view of multiple transducers. In this case, the various fields of view can be arranged, for example, as separate fields of view, overlapping fields of view, identical fields of view, and the like.

For example, the sensor 350 may be placed by the side of the roadway such that the field of view includes a portion of the roadway. The roadway defines the path through the field of view of the sensor 350. The sensor 350 determines the speed of vehicles on the roadway that pass through the field of view 302. The sensor 350 can be mounted at ground level or can be elevated such that it is above the vehicles on the road. The sensor 350 can be used to determine the speed of a target using different measurements that can be obtained with the sensor. The sensor 350 can be used to determine the direction of travel especially if the asymmetrical field of view 303 is used.

The speed can be determined, for example, using distance measurements, phase measurements, and Doppler shift measurements. As the target 301 passes through the field of view 302, for instance, the sensor 350 is able to take multiple distance measurements, represented by the distances 306, 308, and 310. The distance measurements taken by the sensor 350 are usually stored for a particular target and may be used in determining the speed of the target. Alternatively, the distances 306, 308, 310, may represent instances when a measurement (Doppler shift, phase, etc.) is taken by the sensor 350 with respect to the target 301.

Single Transducer Side Fire Speed Measurements

Using Distance Measurements to Determine the Speed of a Vehicle

Figure 4A:
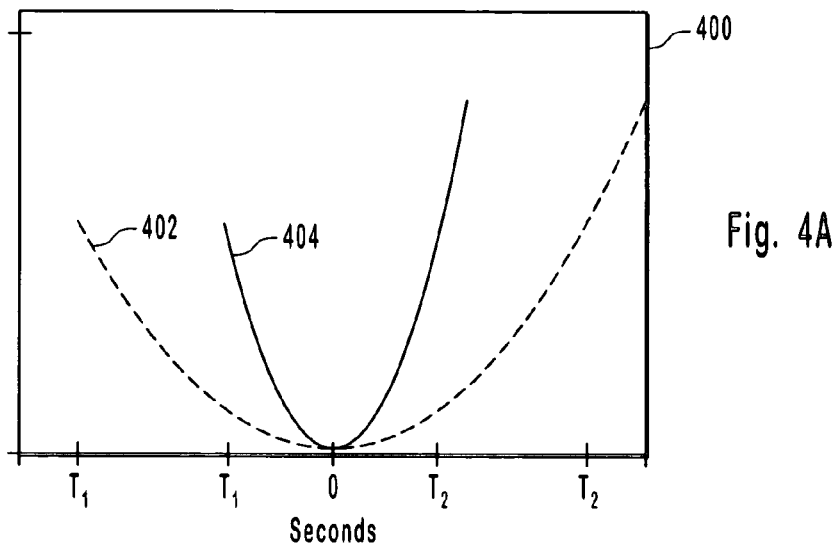
FIG. 4A illustrates the distance measurements over time of a vehicle that are taken by a sensor in a side fire sensor configuration.
Figure 4B:
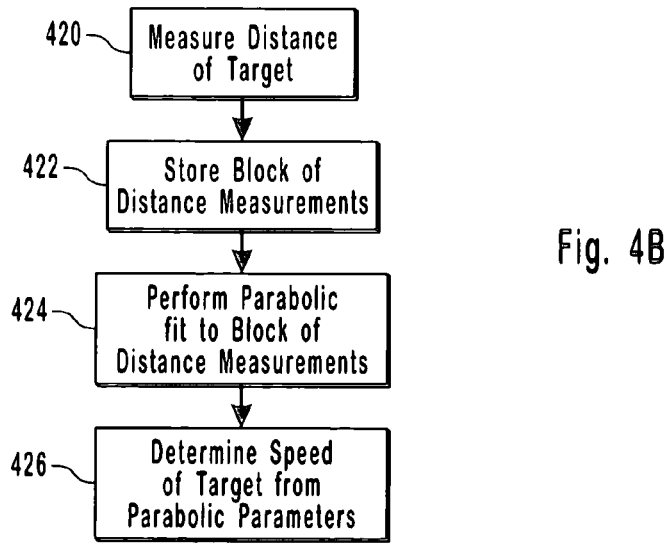
FIG. 4B illustrates one example of a method for measuring the speed of a vehicle using distance measurements.

FIGS. 4A and 4B illustrate an example of a method for determining the speed of a vehicle using distance measurements. As a vehicle passes through the sensor's field of view, a series of distance measurements are taken by the sensor. Because a vehicle is further away from the sensor when the vehicle enters and leaves the field of view of the sensor than when the vehicle is in front of the sensor in the middle of the field of view of the sensor, the resulting series of distance measurements is nearly parabolic. FIG. 4A, for example, illustrates a graph 400 that shows a plot 402 of the distance measurements over time for a vehicle traveling at 25 miles/hour and a plot 404 illustrates the distance measurement over time for a vehicle traveling at 50 miles/hour.

If a target travels at a speed v through the field of view and the distance between the target and the sensor is represented by d and the distance from the sensor to the path of the target is represented by $d_1$ and the time at which the target is perpendicular to the sensor is represented by $T_0$, then the distance to the target as a function of time can be represented by $$d(t) = \sqrt{(v(t-T_0))^2 + d_1^2}.$$

The distance as a function of time can be approximated using a Taylor series expansion as $$d(t) \approx \frac{v^2}{2d_1}(t-T_0)^2 + d_1 = \frac{v^2}{2d_1}(t^2 - 2T_0 + T_0^2) + d_1.$$

The width of the parabola or near parabola traced out by the series of distance measurements is proportional to the velocity of the target and the distance to the target path, which is the minimum distance measured as the target passes the sensor. The speed of a target can be determined from the distance measurements and the width of the parabola.

FIG. 4B illustrates an example for determining the speed of a target using distance measurements. The sensor measures and stores a series of distances to a target (420) as the target passes through the field of view of the sensor. The sensor stores the series of distance measurements (422) that correspond to the target. The series of distance measurements is essentially a time series of distance measurements that were taken periodically as the target passed through the field of view of the sensor. The beginning of the series $T_1$ corresponds to the target entering the field of view of the sensor and the end of the series $T_2$ corresponds to the target leaving the field of view of the sensor. Plotting the series of distance measurements results in a parabolic or near parabolic shape as illustrated in FIG. 4A. In this example, FIG. 4A corresponds to an asymmetrical field of view.

Next, a parabolic fit (consistent with linear algebra theory) is applied to the series of distance measurements (424). The parabolic fit produces offset coefficients a, linear coefficients b, and parabolic coefficients c. The distance from the sensor to the path of the target is the minimum distance measured and can also be derived from the parabolic coefficients. Once the distance between the sensor and the target path is determined or known, the parabolic coefficient c can be converted to a speed measurement (426) using:

$$v = \sqrt{2cd_1}.$$

If an asymmetric field of view is used, then the direction of the target can be determined by extracting the asymmetry information from the distance measurements. This can be done, for example, by using the linear parabolic coefficient (b) and by solving for $T_0$. If $$T_0 > \frac{T_2 - T_1}{2} + T_1,$$

then the target is traveling such that the target enters the field of view on the side of the asymmetry. If $$T_0 < \frac{T_2 - T_1}{2} + T_1,$$

then the target leaves the field of view on the side of the asymmetry. The side of asymmetry is the side with the greater angle between perpendicular and the edge of the field of view. For example, if a field of view, which encompasses 10 degrees, is skewed such that the angle between perpendicular and the edge of the field of view is 3 degrees on the left and 7 degrees on the right then the right side is considered the side of the asymmetry. In this manner, the speed and direction of a target such as a vehicle may be determined using a side fire single transducer configuration.

Using Doppler Shift Measurements to Determine the Speed of a Vehicle

The Doppler shift of a reflected signal is proportional to the velocity of the target and to the angle at which the signal is reflected. This relationship is described by the equation:

$$DopShift = \frac{2v}{\lambda}\sin(\phi).$$

Figure 5A:
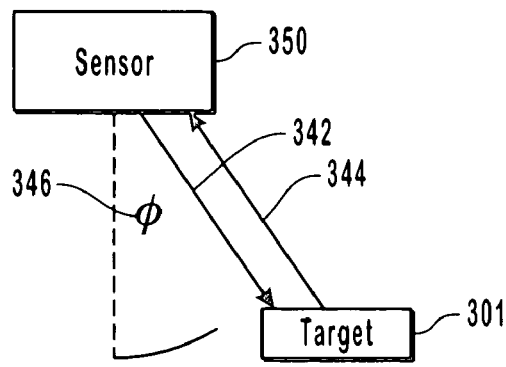
FIG. 5A illustrates a side fire sensor configuration that measures the Doppler shift of a signal reflected by a target in the field of view of the sensor.

FIG. 5A illustrates an example of the angle at which a signal is reflected. The sensor 350 transmits a signal 342 towards a roadway in the field of view of the sensor 350. The signal 342 is reflected by the target 301 and the reflected signal 344 is detected by the sensor 350. The angle 346 is the angle at which the signal is reflected. For small angles we can approximate $\sin(\phi)$ as $\phi$. The angle is defined and approximated as $$\phi = \arctan\left(\frac{vt}{d_1}\right) \approx \frac{vt}{d_1}.$$

Combining these approximations yields $$DopShift \approx \frac{2v^2 t}{\lambda d_1}.$$

Figure 5B:
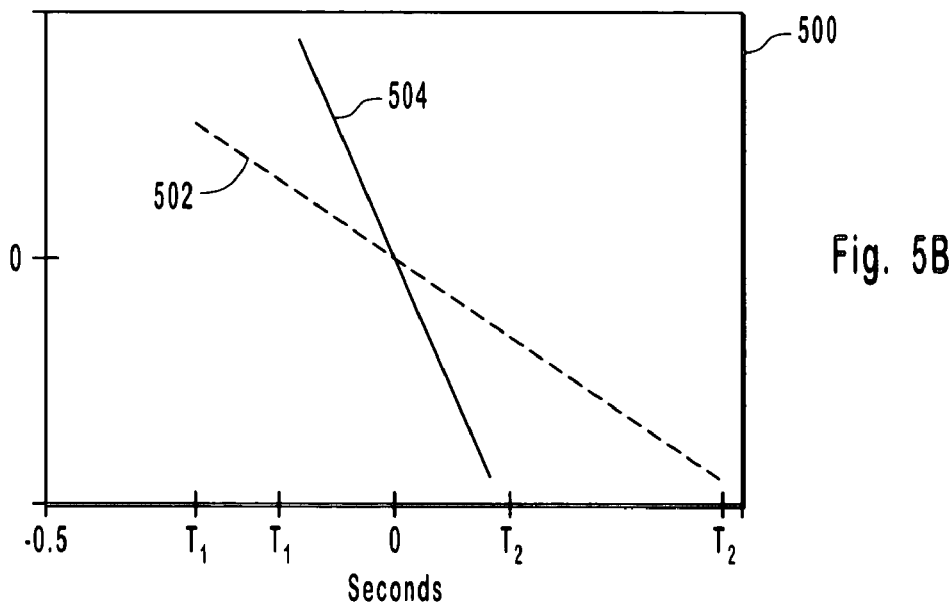
FIG. 5B illustrates the Doppler shift measurements over time of the sensor in FIG. 5A.

Thus, the Doppler shift changes linearly and passes through zero as the target passes through the sensor's field of view. The slope of this linear change is a function of the velocity of the target and the distance of the target's path from the sensor. FIG. 5B depicts a graph 500 that illustrates the linear change of the Doppler shift in the plot 502 and the plot 504. The plot 502 corresponds to a vehicle traveling at 25 miles/hour and the plot 504 corresponds to a vehicle traveling at 50 miles/hour.

Figure 5C:
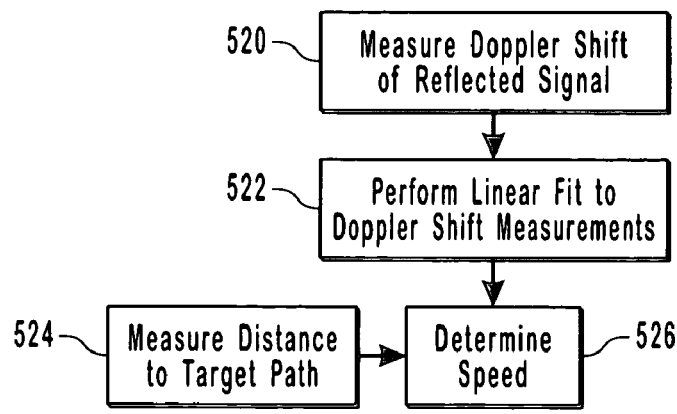
FIG. 5C illustrates one example of a method for measuring the speed of a vehicle using the Doppler shift measurements.

FIG. 5C illustrates an exemplary method for determining the speed of a target, such as a vehicle, using changes in the Doppler shift. The Doppler shift of the reflected angle is measured (520) multiple times as the vehicle passes through the field of view of the side fire sensor. A linear fit is applied to the Doppler shift measurements (522) and results in a slope $m_{Dop}$. The slope $m_{Dop}$ is converted to a speed (526) using:

$$v = \sqrt{\frac{m_{Dop} d_1 \lambda}{2}}.$$

Converting the slope $m_{Dop}$ to a velocity requires the distance between the sensor and the path of the target. Thus, the distance to the target path (524) is included in converting the slope $m_{Dop}$ to a speed (526). At time $T_0$ the target is perpendicular to the sensor and the Doppler shift goes to zero. The direction of the target can be inferred by noting the location of $T_0$ with respect to the time $T_1$ of the target entering the beam and the time $T_2$ of the target leaving the beam as previously described. Alternatively, the amount of Doppler shift $D_1$ that occurs when the target enters and the amount of Doppler shift $D_2$ that occurs when the target leaves the beam can also be used to determine the target velocity. If $D_2 > D_1$, then the target is leaving the beam on the side of the asymmetry as previously defined.

Using Phase Based Measurements to Determine the Speed of a Vehicle

The relationship between a phase $\theta$ of a signal reflected from a target and the distance to the target is:

$$\theta = \mod_{2\pi}\left(\frac{2\pi(2d)}{\lambda}\right),$$

where d is the distance to the target and $\lambda$ is the wavelength of the transmitted signal. Phase unwrapping can be employed to remove the effect of the modulus $2\pi$. After the modulus is removed, the phase of the reflected or returned signal as a function of time can be expressed as:

$$\theta(t) \approx \frac{2\pi v^2}{d_1 \lambda}(t - T_0)^2 + \frac{4\pi d_1}{\lambda}.$$

This equation is derived from the distance approximation previously described and the phase to distance relationship described above. Because the unwrapped phase is quadratic, the same method of extracting a speed used in distance measurements can be used in phase measurements after phase unwrapping is performed. For an additional example that may be used with distance or phase measurements, an alternate method may also be provided. The derivative of the phase with respect to time is:

$$\frac{d\theta}{dt} \approx \frac{4\pi v^2}{d_1 \lambda}(t - T_0).$$

Figure 6:
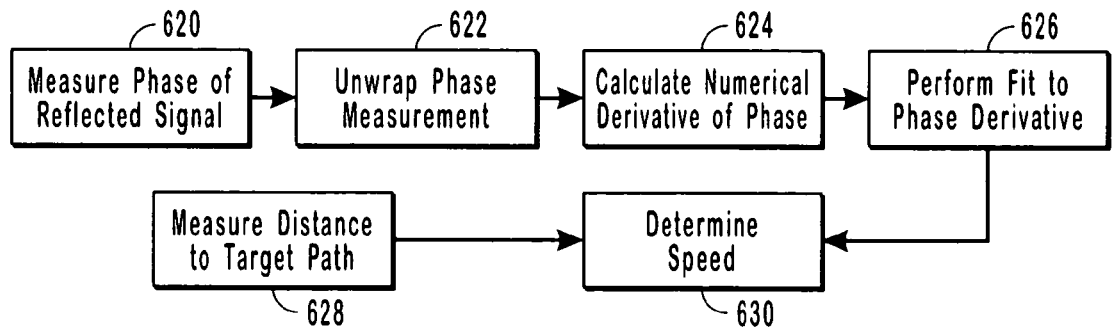
FIG. 6 illustrates one embodiment of a method for measuring the speed of a vehicle using phase measurements.

FIG. 6 is an exemplary method for measuring or monitoring speed using the phase of a reflected signal. When a vehicle enters the field of view of a side fire configuration sensor, the signals transmitted by the sensor are reflected by the vehicle. The phase of the reflected signal is measured (620) multiple times as the vehicle passes through the field of view. The phase measurements are unwrapped (622) as described above. Next, a numerical derivative of the phase is computed (624) and a linear fit is applied to the phase derivative (626).

In order to determine the speed (630) of the vehicle, the distance from the sensor to the target path is also obtained (628). The distance from the sensor to the target path is provided by sensor. The linear fit of the phase derivative (626) results in a slope m and the speed of the vehicle is determined (630) by the equation:

$$v = \sqrt{\frac{md_1\lambda}{4\pi}}.$$

In addition to determining the vehicle direction from the parabolic shape as described in the distance based direction measurement, the direction can be determined by comparing the time that the derivative of the phase goes to zero, $T_0$ to the time that the target enters the view, $T_1$, and the time that it leaves the view, $T_2$.

Figure 7:
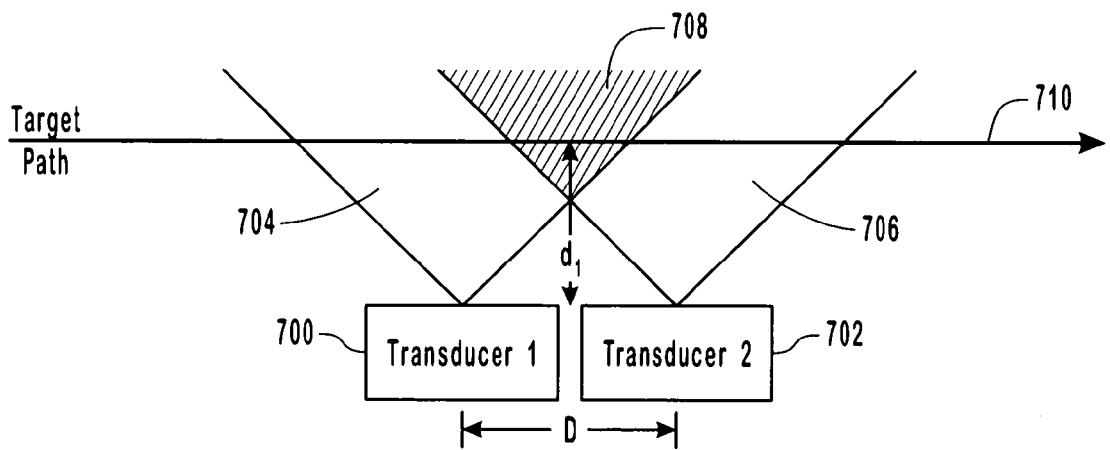
FIG. 7 illustrates the path of a target through the field of view of a dual transducer side fire sensor configuration and illustrates that the fields of view of the dual transducers overlap.

FIG. 7 illustrates a dual transducer sensor configuration. In FIG. 7, the transducer 700 is laterally separated from the transducer 702 by a distance D. The transducers 700 and 702 can be mounted in a single sensor or in two separate sensors. The area 708 is where the field of view 704 of the transducer 700 overlaps with the field of view 706 of the transducer 702. A vehicle typically follows the target path 710 through the fields of view 704 and 706. The target path 710 is a distance $d_1$ from the transducers 700 and 702. The field of view of the dual transducer sensor includes the fields of view 704 and 706.

The speed of a target can be computed using the signals reflected by a target and received by the laterally separated transducers 700 and 702. The speed of the target is proportional to the delay between the reflected signals received by each of the transducers 700 and 702. In this example, the transducer 700 is generating a signal that is very similar to the signal generated by the transducer 702. As a result, the reflected signals received by the transducers 700 and 702 are very similar. The reflected signals are separated by a time delay. The speed of the target can be determined in a dual transducer configuration using digital correlation, time delay measurements based on signal detection, and an analog combination of the signals.

Figure 8A:
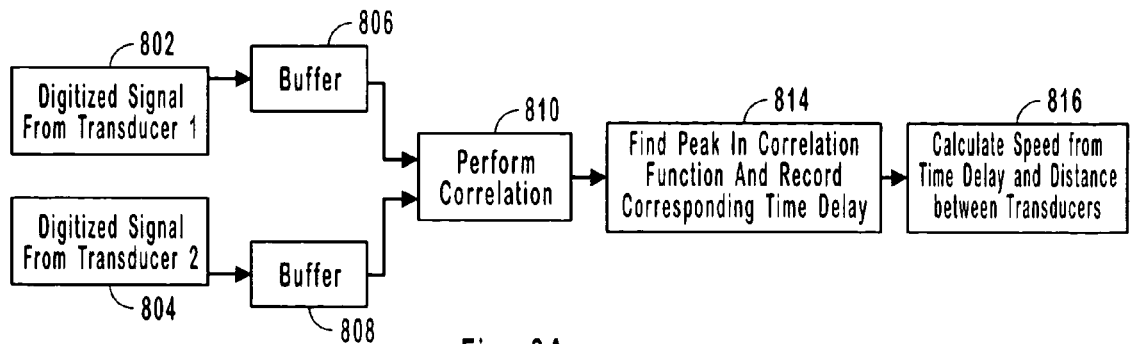
FIG. 8A illustrates one embodiment of a method for measuring the speed of a vehicle using two transducers in a dual transducer side fire sensor configuration.

FIG. 8A illustrates one embodiment of a method for determining the speed of a vehicle by correlating the signals received by the respective transducers 700 and 702. The signal correlation 810 receives the buffered signal 806 from transducer 1 and the buffered signal 808 from transducer 2. The resulting correlation function is a time series indicating the degree to which the two signals are correlated over a range of time delays. From this correlation function, a peak correlation is found (814) and the time delay corresponding to this peak is recorded (814). The speed of the vehicle is computed (816) from the time delay and the distance D between the first transducer and the second transducer using the relationship $$v = \frac{D}{T_D}.$$

If the peak in the correlation corresponds to a time delay of the signal from transducer 1 then the target is traveling so that it enters the field of view of transducer 1 first. In this manner, the direction of the target can be determined.

The present invention has the advantage of using wide beams to provide more extensive signals that ultimately result in more accurate speed measurements. Also, the signals received by the transducers include more information than a simple beam interruption. The signals received by the transducers include return power, vehicle range, and signal phase, for example. Also, the additional information included in the received signals permits the transducers to be placed closer together without sacrificing accuracy in the measurement of the vehicle speed. In one embodiment, the two transducers can be mounted in a single sensor housing.

Figure 8B:
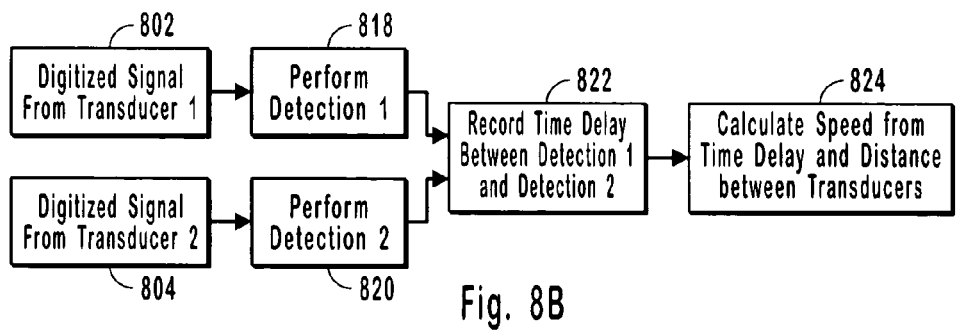
FIG. 8B illustrates another embodiment of a method for measuring the speed of a vehicle using two transducers in a dual transducer side fire sensor configuration.

FIG. 8B illustrates another embodiment of a dual transducer method for measuring the speed of a vehicle. In this example, the time delay between the signals can be measured directly using detection. The time delay is the time between detections in each signal. In FIG. 8B, a detection 818 is performed on the digitized signal 802 from the first transducer and a detection 820 is performed on the digitized signal 804 from the second transducer. The time delay between the detection 818 and the detection 820 is recorded and the speed is calculated (824) using the recorded time delay and the distance D between the transducers using the relationship $$v = \frac{D}{T_D}.$$

If $T_D = T_2 - T_1$ where $T_2$ is the time of detection of transducer two and $T_1$ is the time of detection of the transducer one, then $T_D$ will be positive if the target enters the field of view of transducer one before entering the field of view of transducer two. The direction of travel of the target can thus be determined from the sign of the time delay.

One advantage of the method illustrated in FIG. 8B is that the two transducers are generating substantially identical beams that are laterally separated by a small distance. This enables the two very similar signals to be combined more accurately. In contrast, a smaller signal beam nested inside a larger signal beam does not produce similar signals to the degree that identical beams produce similar signals.

Figure 8C:
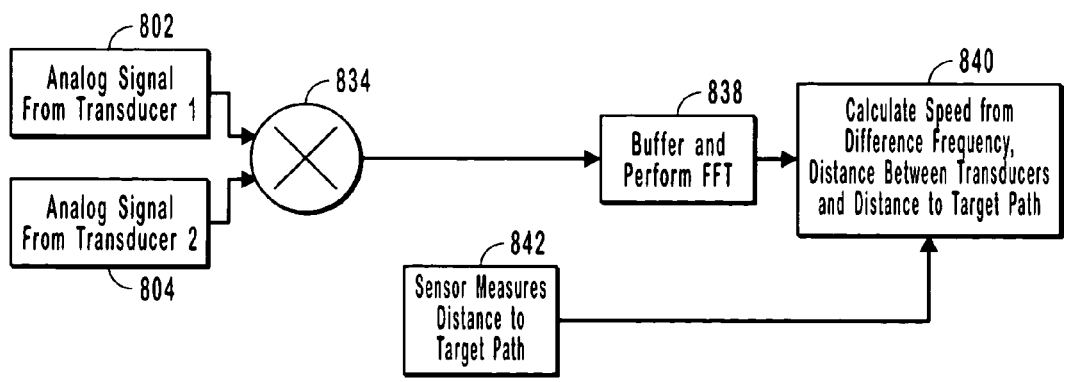
FIG. 8C illustrates yet another embodiment of a method for measuring the speed of a vehicle using two transducers in a dual transducer side fire sensor configuration.

FIG. 8C illustrates another method for using a dual transducer sensor configuration to measure the speed of a vehicle. In this example, a signal from each transducer is multiplied or mixed. The time delay can be extracted from the result of the multiplication. In FIG. 8C, the signal 802 from the first transducer is multiplied or mixed (834) with the analog signal 804 from the second transducer. In this embodiment, a Fast Fourier Transform is performed on the resulting signal. Using the distance to the target path, which is measured by the sensor (842), the speed of a vehicle can be computed using the frequency difference obtained from the multiplied digital signal, the distance D between the fields of view, and the distance to the target path.

More specifically, the Doppler shift of each signal is slightly different due to the slight difference between the angles of reflection for the two analog signals. This frequency difference is typically constant as the vehicle passes through the transducer beams. One of the components of the output of the multiplication in FIG. 8C is a signal with a frequency equal to the difference between the frequencies of the analog signals 802 and 804. This component has a constant frequency that is proportional to the distance between the transducers and the speed of the vehicle. The frequency difference can be represented as $$f_{Diff} = \frac{2vD}{\lambda d_1}.$$

The velocity of the vehicle can be determined by solving for v.

If the signals from each transducer are complex representing the in-phase and quadrature portions of the signal or if they are complex representing the magnitude and phase of the output of a particular range filter, then the conjugation of the signal from the second transducer should be performed before performing the multiplication. In this case, the result of the multiplication is complex. If the resulting signal exhibits positive phase rotation, then the Doppler shift observed by the first transducer is larger than the Doppler shift observed by the second transducer, which indicates that the target enters the field of view of the second transducer first. Thus, the direction of travel of the target can be determined.

Figure 11:
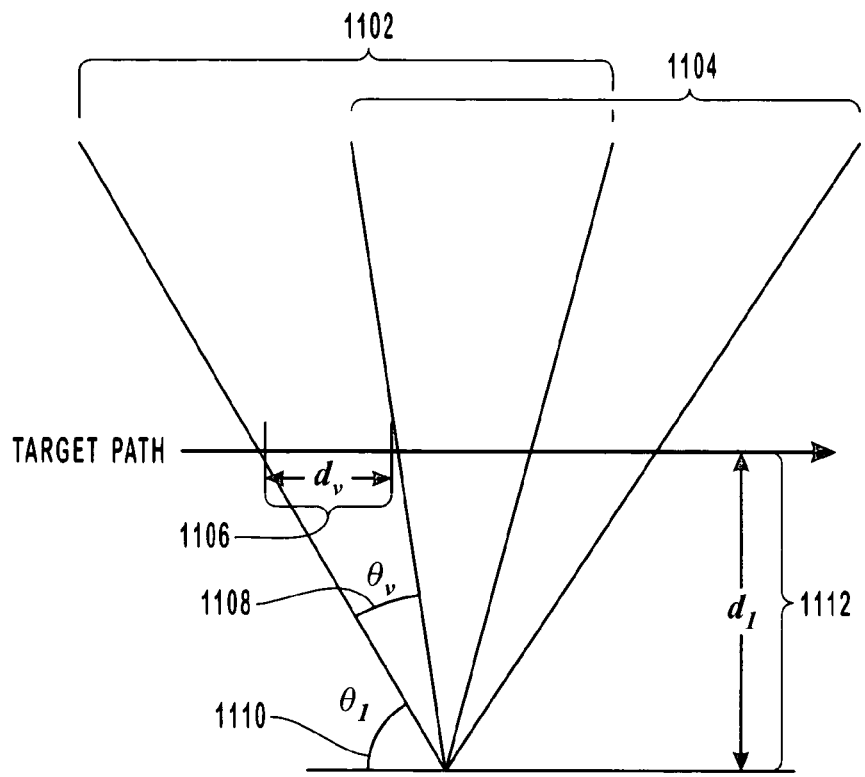
FIG. 11 illustrates overlapping fields of view in a dual transducer system.

Systems that employ the use of dual transducers to determine the speed of a target may use separate units to create two fields of view or the two fields of view may be created by one unit and still be considered a dual transducer system. For example, a single steerable antenna could be used to create two fields of view by steering its beam to two different locations. If two fields of view are created by one unit or by two units that are steered at different angles but are not separated laterally, then instead of using the distance between the two transducers in speed calculations, the distance between the fields of view must be used as shown in FIG. 11. The field of view 1102 overlaps the field of view 1104 in this example.

FIG. 11 illustrates a field of view 1102 and a field of view 1104 that are separated by a distance 1106. The target path is a distance 1112 from the sensor. The distance 1106 between the fields of view, $d_v$, can be calculated using $$d_v = 2d_1 \tan\left(\frac{\theta}{2}\right),$$

where $d_1$ is the distance 1112 to the target path and $\theta_v$ is the angle 1108 between the two fields of view.

Figure 12:
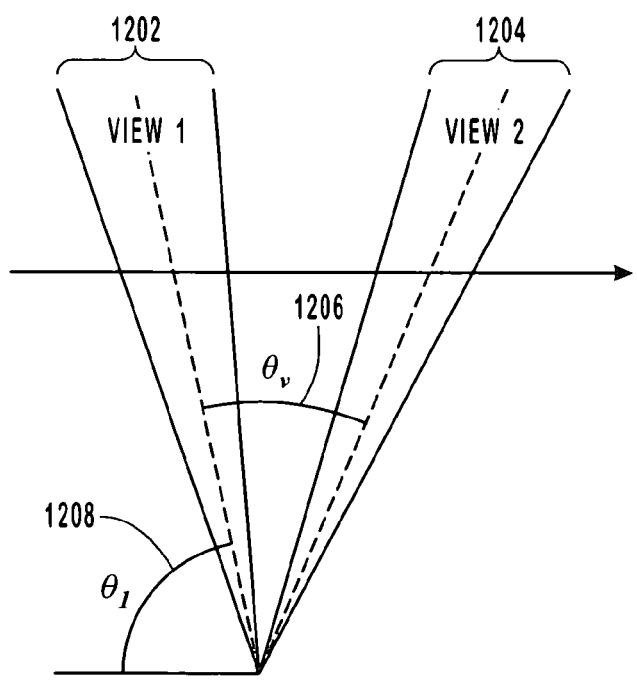
FIG. 12 illustrates not overlapping fields of view in a dual transducer system.

FIG. 12 illustrates another method for using a dual transducer side fire sensor configuration to measure the speed of a vehicle. In FIG. 12, the field of view 1202 does not overlap the field of view 1204 and the angle 1206 separates the fields of view 1202 and 1204. In this example, Doppler measurements are made from two transducers whose fields of view may or may not overlap. The Doppler measurements from each transducer are compared and the velocity of the target as well as the alignment angle 1208, $\theta_1$, of the sensor can be calculated. For example, if the average Doppler measurement from the first transducer is $D_1$ and the average Doppler measurement from the second transducer is $D_2$ then we can define the following set of equations $$D_1 = \frac{2v}{\lambda}\sin(\theta_1), D_2 = \frac{2v}{\lambda}\sin(\theta_1 + \theta_v)$$

where v is the speed of the target, $\lambda$ is the wavelength at the transmission frequency, and $\theta_v$ is the angle 1206 between the two fields of view 1202 and 1204. This set of equations contains only two unknowns, v and $\theta_1$, thus the unknowns can be found by solving the equations simultaneously. Furthermore, $\theta_1$ does not change with time and its estimate can be refined with each new target. Alternatively, $\theta_1$ could be found during a configuration mode and this fixed value could be used for all subsequent velocity computations.

If the Doppler shift measurement $D_1$ is greater than $D_2$ then the target is traveling such that it enters the field of view of the first transducer first. Thus, the direction of the target can be determined from the relative Doppler shift measurements from the two transducers.

The dual transducer systems described above employ only two transducers but the same speed and direction estimation methods could be used in systems having more than two transducers. In this case, multiple time delay, or frequency difference, measurements will be created that can be combined to reduce the measurement error. For example a system that employs three transducers could generate up to three independent time delay measurements, or frequency difference measurements, that could then be averaged.

Typically the received signal discussed in the dual transducer system is a reflection of a signal transmitted by the system but the methods discussed may also be implemented by receiving a signal that is transmitted by the target. For example, cell phone transmission, two way radio transmissions, engine noise, or other electromagnetic and acoustic signals could be used with these methods.

Figure 9:
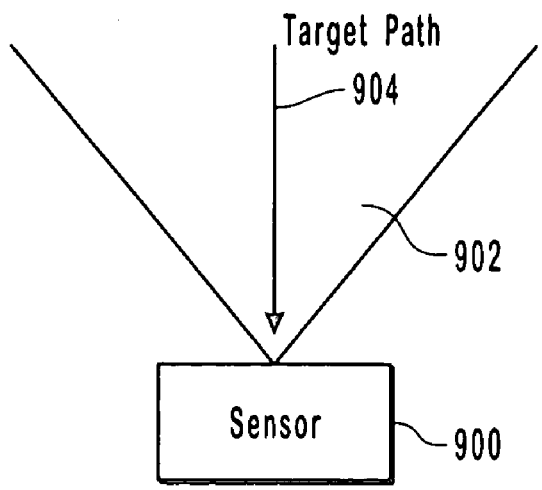
FIG. 9 illustrates the path of a target through the field of view of a sensor in a forward fire sensor configuration.

FIG. 9 illustrates a forward fire configuration. In FIG. 9, a target follows a target path 904 through the field of view 902 of the sensor 900. The target is moving towards the sensor 900, or the target may also be moving away from the sensor 900. As in the other sensor configurations described above, more than one vehicle can be tracked and monitored simultaneously.

Figure 10:
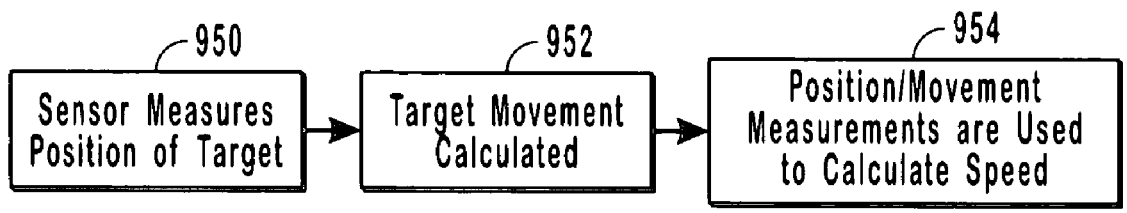
FIG. 10 illustrates one embodiment of a method for measuring the speed of multiple vehicles with a forward fire configured sensor.

In FIG. 10, to determine speed using a forward fire configuration, the sensor first measures a position (950) of each vehicle in the field of view of the sensor. In one embodiment, all vehicles in the field of view can be monitored at the same time. Next, the movement of the vehicles is monitored (952) from the initial detection of the vehicle until the target exits the field of view of the sensor. This is accomplished, in one embodiment, using a Kalman filter. Finally, the position or movement measurements are used to calculate the speed (954) of the vehicles. In one example, the position measurement is simply a range measurement and the sequence of range measurements can be converted to a velocity by finding the rate of change of the distance measurements.

If the vehicle is approaching the sensor and the rate of change is defined as the more recent measurement minus the older measurement, then the rate of change will be negative. Thus the direction of the target can be determined from the sign of the rate of change of distance measurements.

The speed estimation methods described above for both single transducer and dual transducer systems can be performed on the signal directly from the transducers. However, range gating, range discrimination, or other processing may be performed on the signals before the speed estimation methods described herein are performed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for measuring a speed of a vehicle approaching an intersection as the vehicle passes through a field of view of a dual transducer sensor configuration, the method comprising:
  receiving one or more signals at a first transducer of the dual sensor configuration, the one or more signals received at the first transducer being reflected off of or emanating from a vehicle as the vehicle passes through a first field of view of the first transducer;
  receiving one or more signals at a second transducer of the dual transducer sensor configuration, each of the one or more signals received at the second transducer having a time delay relative to a corresponding signal received at the first transducer resulting in a series of time delays between signals received at the first transducer and signals received at the second transducer, the one or more signals received at the second transducer being reflected off of or emanating from the vehicle as the vehicle passes through a second field of view of the second transducer, wherein the second field of view at least partially overlaps with the first field of view;
  performing a plurality of correlations between the one or more signals received at the first transducer and the one or more signals received at the second transducer, wherein the result is a correlation function indicating the correlation between signals received at the first transducer and signals received at the second transducer for the series of time delays;
  identifying a time delay, from among the series of time delays, corresponding to a peak correlation in the correlation function;
  determining the speed of the vehicle using the identified time delay and a distance between the first transducer and the second transducer;
  using the determined speed to monitor the safety of the intersection;
  the first transducer transmitting one or more transmitted signals into the field of view of the first transducer; and
  the second transducer transmitting one or more transmitted signals into the field of view of the second transducer such that the one or more transmitted signals transmitted into the field of view of the second transducer at least partially overlap with the one or more transmitted signals transmitted into the field of view of the first transducer.

2. A method as defined in claim 1, wherein said one or more signals received at the first transducer comprises one or more of:
  a radio frequency signal;
  an infrared signal;
  a laser signal; and
  an acoustic signal.

3. A method as defined in claim 1, wherein receiving one or more signals at the first transceiver comprises receiving one or more signals from the vehicle or from within the vehicle.

4. A method as defined in claim 1, wherein determining the speed of a vehicle using the identified time delay and a distance between the first transducer and the second transducer further comprises:
  calculating the speed of the vehicle using a magnitude of the identified time delay;
  calculating a direction of travel of the vehicle using a sign of the identified time delay.

5. A method as defined in claim 1, wherein more than two transducers are used to provide multiple time delay measurement that can be combined to reduce measurement error.

6. The method as recited in claim 1, wherein the dual transducer sensor configuration comprises a side fire sensor.

7. The method as recited in claim 1, wherein
  receiving one or more signals at the first transducer comprises receiving one or more reflected electromagnetic radio frequency signals; and
  receiving one or more signals at the second transducer comprises receiving one or more reflected electromagnetic radio frequency signals.

8. A method for measuring a speed of a vehicle approaching an intersection as the vehicle passes through a field of view of a dual transducer sensor configuration, the method comprising:
  receiving one or more signals at a first transducer of the dual transducer sensor configuration, the one or more signals received at the first transducer being reflected off of or emanating from a vehicle as the vehicle passes through the field of view of the first transducer;
  receiving one or more signals at a second transducer of the dual transducer sensor configuration, each of the one or more signals received at the second transducer having a time delay relative to a corresponding signals received at the first transducer resulting in a series of time delays between signals received at the first transducer and signals received at the second transducer, the one or more signals received at the second transducer being reflected off of or emanating from the vehicle as the vehicle passes through the field of view of the second transducer;
  performing a plurality of correlations between the one or more signals received at the first transducer and the one or more signals received at the second transducer, wherein the result is a correlation function indicating the correlation between signals received at the first transducer and signals received at the second transducer for the series of time delays;
  identifying a time delay, from among the series of time delays, corresponding to a peak correlation in the correlation function;
  determining the speed of the vehicle using the identified time delay and a distance between the first transducer and the second transducer;
  using the determined speed to monitor the safety of the intersection
  the first transducer transmitting one or more transmitted signals into the field of view of the first transducer; and
  the second transducer transmitting one or more transmitted signals into the field of view of the second transducer such that the one or more transmitted signals transmitted into the field of view of the second transducer at least partially overlap with the one or more transmitted signals transmitted into the field of view of the first transducer.

9. A method as defined in claim 8, wherein said one or more signals received at the first transducer comprises one or more of:
  a radio frequency signal;
  an infrared signal;
  a laser signal; and
  an acoustic signal.

10. A method as defined in claim 8, wherein receiving one or more signals at the first transceiver comprises receiving one or more signals from the vehicle or from within the vehicle.

11. A method as defined in claim 8, wherein determining the speed of a vehicle using the identified time delay and a distance between the first transducer and the second transducer further comprises:

calculating the speed of the vehicle using a magnitude of the identified time delay; and calculating a direction of travel of the vehicle using a sign of the identified time delay.

12. A method as defined in claim 8, wherein more than two transducers are used to provide multiple time delay measurements that can be combined to reduce measurement error.

13. The method as recited in claim 8, wherein the dual transducer sensor configuration comprises a side fire sensor.

14. The method as recited in claim 8, wherein receiving one or more signals at the first transducer comprises:

receiving one or more reflected electromagnetic radio frequency signals; and receiving one or more signals at the second transducer comprises receiving one or more reflected electromagnetic radio frequency signals.

15. A method for measuring a speed of a vehicle on a roadway as the vehicle passes through a field of view of a dual transducer sensor configuration, the method comprising:

receiving one or more signals at a first transducer of the dual transducer sensor configuration, the one or more signals received at the first transducer being reflected off of or emanating from a vehicle as the vehicle passes through the field of view of the first transducer;

receiving one or more signals at a second transducer of the dual transducer sensor configuration, each of the one or more signals received at the second transducer having a time delay relative to a corresponding signal received at the first transducer resulting in a series of time delays between signals received at the first transducer and signals received at the second transducer, the one or more signals received at the second transducer being reflected off of or emanating from the vehicle as the vehicle passes through the field of view of the second transducer, wherein the field of view of the second transducer at least partially overlaps with the field of view of the first transducer;

performing a plurality of correlations between the one or more signals received at the first transducer and the one or more signals received at the second transducer, wherein the result is a correlation function indicating the correlation between signals received at the first transducer and signals received at the second transducer for the series of time delays;

identifying a time delay, from among the series of time delays, corresponding to a peak correlation in the correlation function;

determining the speed of the vehicle using the identified time delay and a distance between the first transducer and the second transducer;

using the determined speed to monitor traffic on the roadway the first transducer transmitting one or more transmitted signals into the field of view of the first transducer; and the second transducer transmitting one or more transmitted signals into the field of view of the second transducer such that the one or more transmitted signals transmitted into the field of view of the second transducer at least partially overlap with the one or more transmitted signals transmitted into the a field of view of the first transducer.

16. A method as defined in claim 15, wherein said one or more signals received at the first transducer comprises one or more of:

a radio frequency signal;
an infrared signal;
a laser signal; and
an acoustic signal.

17. A method as defined in claim 15, wherein receiving one or more signals at the first transceiver comprises receiving one or more signals from the vehicle or from within the vehicle.

18. A method as defined in claim 15, wherein determining the speed of a vehicle using the identified time delay and a distance between the first transducer and the second transducer further comprises:

calculating the speed of the vehicle using a magnitude of the identified time delay;

calculating a direction of travel of the vehicle using a sign of the identified time delay.

19. A method as defined in claim 15, wherein more than two transducers are used to provide multiple time delay measurements that can be combined to reduce measurement error.

20. The method as recited in claim 15, wherein the dual transducer sensor configuration comprises a side fire sensor.

21. The method as recited in claim 15, wherein receiving one or more signals at the first transducer comprises receiving one or more reflected electromagnetic radio frequency signals; and receiving one or more signals at the second transducer comprises receiving one or more reflected electromagnetic radio frequency signals.

22. A method for measuring a speed of a vehicle on a roadway as the vehicle passes through a field of view of a dual transducer sensor configuration, the method comprising:

receiving one or more signals at a first transducer of the dual transducer sensor configuration, the one or more signals received at the first transducer being reflected off of or emanating from a vehicle as the vehicle passes through the field of view of the first transducer;

receiving one or more signals at a second transducer of the dual transducer sensor configuration, each of the one or more signals received at the second transducer having a time delay relative to a corresponding signal received at the first transducer resulting in a series of time delays between signals received at the first transducer and signals received at the second transducer, the one or more signals received at the second transducer being reflected off of or emanating from the vehicle as the vehicle passes through the field of view of the second transducer;

performing a plurality of correlations between the one or more signals received at the first transducer and the one or more signals received at the second transducer, wherein the result is a correlation function indicating the correlation between signals received at the first transducer and signals received at the second transducer for the series of time delays;

identifying a time delay, from among the series of time delays, corresponding to a peak correlation in the correlation function;

determining the speed of the vehicle using the identified time delay and a distance between the first transducer and the second transducer;

using the determined speed to monitor traffic on the roadway;

the first transducer transmitting one or more transmitted signals into the field of view of the first transducer; and the second transducer transmitting one or more transmitted signals into the field of view of the second transducer such that the one or more transmitted signals transmitted into the field of view of the second transducer at least partially overlap with the one or more transmitted signals transmitted into the field of view of the first transducer.

23. A method as defined in claim 22, wherein said one or more signals received at the first transducer comprises one or more of:
- a radio frequency signal;
- an infrared signal;
- a laser signal; and
- an acoustic signal.

24. A method as defined in claim 22, wherein receiving one or more signals at the first transceiver comprises receiving one or more signals from the vehicle or from within the vehicle.

25. A method as defined in claim 22, wherein determining the speed of a vehicle using the identified time delay and a distance between the first transducer and the second transducer further comprises:

calculating the speed of the vehicle using a magnitude of the identified time delay; and calculating a direction of travel of the vehicle using a sign of the identified time delay.

26. A method as defined in claim 22, wherein more than two transducers are used to provide multiple delay measurements that can be combined to reduce measurement error.

27. The method as recited in claim 22, wherein the dual transducer sensor configuration comprises a side fire sensor.

28. The method as recited in claim 22, wherein receiving one or more signals at the first transducer comprises:

receiving one or more reflected electromagnetic radio frequency signals; and receiving one or more signals at the second transducer receiving one or more reflected electromagnetic radio frequency signals.

\* \* \* \* \*

UNITED STATES PATENT AND TRADEMARK OFFICE
CERTIFICATE OF CORRECTION

PATENT NO. : 7,426,450 B2  
APPLICATION NO. : 10/754217  
DATED : September 16, 2008  
INVENTOR(S) : Arnold et al.

Page 1 of 1

It is certified that error appears in the above-identified patent and that said Letters Patent is hereby corrected as shown below:

Column 4
Line 35, remove "both"

Column 13
Line 67, change "measurement" to --measurements--

Signed and Sealed this

Fourth Day of August, 2009

JOHN DOLL
*Acting Director of the United States Patent and Trademark Office*